(12) United States Patent
Shimamura (10) Patent No.: US 7,144,167 B2
(45) Date of Patent: Dec. 5, 2006

(54) COLOR PRINTING WHICH RENDERS MULTI TONE COLOR INPUT CODES TO IMAGE DATA WITH REFERENCE TO FONT DATA

(75) Inventor: Yoshiyuki Shimamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/043,071

(22) Filed: Jan. 27, 2005

(65) Prior Publication Data
US 2005/0169686 A1    Aug. 4, 2005

(30) Foreign Application Priority Data
Jan. 29, 2004    (JP) .............. 2004-021318

(51) Int. Cl.
    B41J 11/44    (2006.01)
    G06K 15/00    (2006.01)
(52) U.S. Cl. ....................... 400/76; 358/1.15
(58) Field of Classification Search .......... 400/76; 358/1.9, 3.1, 1.1, 1.15
    See application file for complete search history.

(56) References Cited
U.S. PATENT DOCUMENTS
5,093,903 A * 3/1992 Sudoh et al. ............. 358/1.2
5,355,233 A * 10/1994 Okamoto ................. 358/3.07
5,404,432 A * 4/1995 Koopman et al. .......... 715/528
5,638,183 A * 6/1997 Hayashi et al. ........... 358/300

FOREIGN PATENT DOCUMENTS
JP    8-169142    7/1996
JP    10-129041    5/1998

* cited by examiner

Primary Examiner—Judy Nguyen
Assistant Examiner—Wasseem H. Hamdan
(74) Attorney, Agent, or Firm—Fitzpatrick, Cella, Harper & Scinto

(57) ABSTRACT

A printing apparatus has a printhead which can print in a multi tone levels, and a font memory for storing font data for respective colors including at least different grayscale data, in correspondence with codes. The apparatus reads out font data for respective colors which are stored in font memory in correspondence to an input code, and renders the font data to image data in print buffers for respective colors. The apparatus then outputs the image data for respective colors stored in the print buffers to the printhead, thus printing a color image.

6 Claims, 8 Drawing Sheets

8 PIXELS (1 BYTE)

40 LINES

40 PIXELS (5 BYTES)

FIG. 2B

4 PIXELS (1 BYTE)

40 LINES

LEFT 20 PIXELS (5 BYTES)   RIGHT 20 PIXELS (5 BYTES)

| CHARACTER CODE | STORAGE ADDRESS OF FONT DATA |

COLOR PRINTING WHICH RENDERS MULTI TONE COLOR INPUT CODES TO IMAGE DATA WITH REFERENCE TO FONT DATA

FIELD OF THE INVENTION

The present invention relates to a color printing apparatus which renders input codes to image data with reference to font data and prints them in color, a control method thereof, and a printer driver.

BACKGROUND OF THE INVENTION

A printing apparatus, which receives print data including character codes from an external apparatus such as a host computer or the like, reads out font information corresponding to the character codes from an internal font memory, renders the character codes into pattern information, and prints them out, is known.

In recent years, such character codes include those which can designate pictorial symbols used in mobile phones and the like other than the Japanese Industrial Standard (JIS) character codes, and it is demanded to make colorful print of color pictorial symbols and the like using these character codes.

In order to print such color pictorial symbols with good quality, the number of tone levels (tones) per pixel of a pictorial symbol must be increased. As an example that pertains to printing of color character fonts, Japanese Patent Laid-Open Nos. 8-169142, 10-129041 and the like disclose printing color pictorial symbols. However, these references handle fonts of color pictorial symbols as binary bitmaps, resulting in poor appearance of the printed image.

In order to print clear pictorial symbols, font data of such pictorial symbols may be stored as 8-bit (256-level) in each color of RGB or CMY. However, with this arrangement, a large memory size is required to store the font data of pictorial symbol data, resulting in an increase in cost. Furthermore, upon converting such multi-valued data into bitmap image data (binary data), a printing apparatus requires an n-valued conversion process such as error diffusion, multi-valued dithering, and the like, resulting in a low print speed.

SUMMARY OF THE INVENTION

The present invention has been made in consideration of the above problems, and has as its features to provide a color printing apparatus which can print a high-quality image by storing font data corresponding to respective colors in correspondence with codes and rendering the codes into image data using the font data, a control method thereof, and a printer driver.

According to the present invention, there is provided with a color printing apparatus comprising:

color print means for printing in multi tone levels;

font storage means for storing font data having at least different tone levels for respective colors, in correspondence with each code;

rendering means for reading out font data stored in the font storage means for respective colors, in correspondence to an input code, and rendering the font data to image data for respective colors; and control means for outputting the image data for respective colors rendered by the rendering means to the color print means and controlling to cause the color print means to print the image data, wherein the font storage means stores font data of colors which can be printed by the color print means.

Further, there is provided with a method of controlling a color printing apparatus having color print means for printing in a multi tone levels, and font storage means for storing font data for respective colors including data of multi tone levels, in correspondence with codes, the method comprising:

a rendering step of reading out font data for respective colors stored in the font storage means in correspondence to an input code, and rendering the font data to image data for respective colors; and a control step of outputting the image data for respective colors rendered in the rendering step to the color print means and controlling the color print means to print the image data, wherein the font storage means stores font data of colors which can be printed by the color print means.

This summary of the invention does not necessarily describe all necessary features so that the invention may also includes a sub-combination of these described features.

Other features, objects and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B depict the configuration of font data per character according to the embodiment of the present invention, in which

PREFERRED DESCRIPTION OF THE EMBODIMENTS

Preferred embodiments of the present invention will be described in detail hereinafter with reference to the accompanying drawings. The present invention is not limited by the disclosure of the embodiments, and all combinations of the features described in the embodiments are not always indispensable to solving the means of the present invention.

Figure 1:
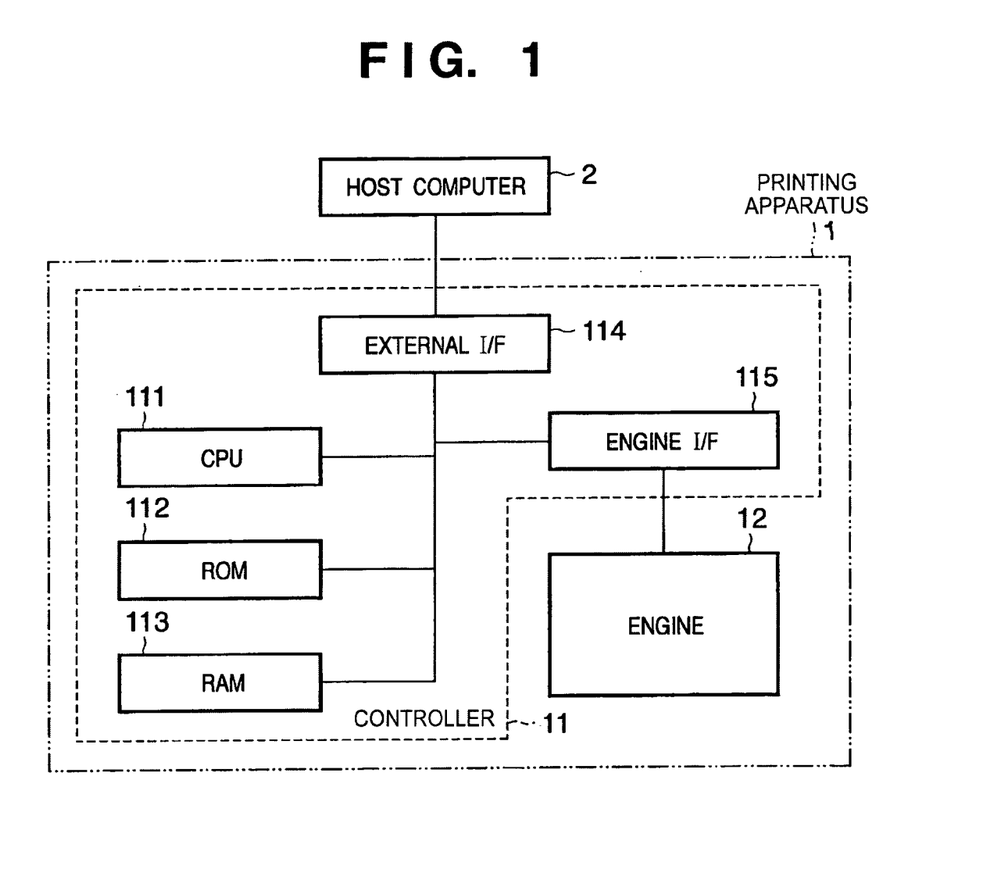
FIG. 1 is a block diagram showing an example of the arrangement of a printing apparatus according to an embodiment of the present invention.

FIG. 1 is a block diagram showing an example of the arrangement of a printing apparatus according to an embodiment of the present invention.

A printing apparatus 1 is roughly divided into a controller 11 and engine 12. The controller 11 is connected to a host computer 2 as an external apparatus, and receives various data such as print data including character data, raster data and the like, and control data and so forth from the host computer 2.

The controller 11 comprises a CPU 111, ROM 112, RAM 113, external I/F 114, engine I/F 115, and the like. The CPU 111 executes a control program stored in the ROM 112 to control the operation of the overall printing apparatus 1. The ROM 112 stores font data of characters, color pictorial symbols, and the like in addition to this control program. The CPU 111 converts a character code included in print data transmitted from the host computer into print image data with reference to the font data stored in the ROM 112. More specifically, the CPU 111 controls the overall controller 11 so that the CPU 111 interprets print data sent from the host computer 2 via the external I/F 114, renders the print data as image data on predetermined areas of the RAM 113 for respective print colors with reference to the ROM 112 and the like, on the basis of the interpretation result, and outputs the image data to the engine 12 via the engine I/F 115.

The engine 12 is a type of printer engine such as an ink-jet, electrophotography, or the like, which can make color print. Note that this embodiment will exemplify an ink-jet printer, but the present invention is not limited to the ink-jet printer. A case will be explained below wherein the printer engine 12 comprises printheads for respectively ejecting yellow (Y), magenta (M), cyan (C), and black (Bk) ink. In addition, the printheads which print by ejecting yellow and black ink print based on binary data that expresses whether or not ink is to be ejected, and the magenta and cyan printheads can print based on a 4-valued data by changing the ink dot size in accordance with 2-bit data.

In this way, the printing apparatus 1 according to this embodiment can print binary black and yellow data and 4-valued cyan and magenta data. Hence, the number of tone levels (tone) of respective pixels of print image data is defined by binary data (1 bit) in case of black and yellow, and is defined by 4-valued data (2 bits) in case of cyan and magenta.

Figure 2A:
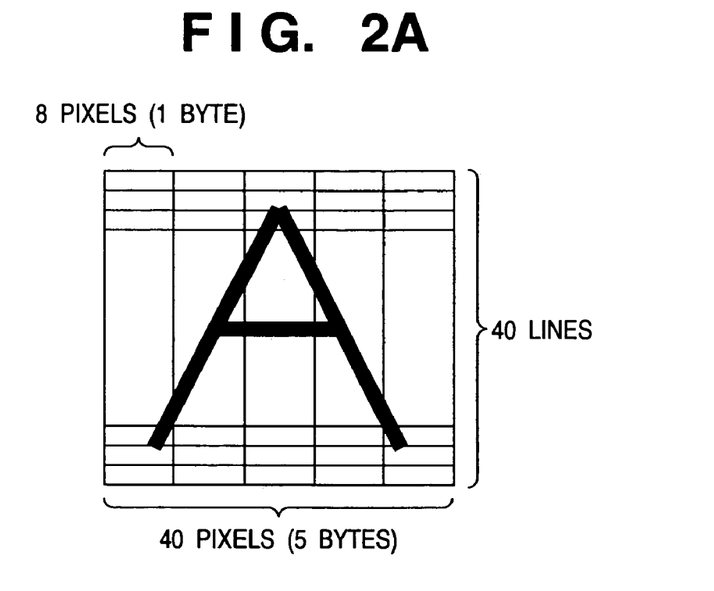
FIG. 2A shows the configuration of black and yellow font data.

FIG. 2A shows the configuration of black or yellow font data per character. In FIG. 2A, font data per character is configured by 40 pixels (horizontal)×40 lines (vertical). In case of this font data, since each pixel is expressed by 1 bit, the number of bits per line is 40 bits, i.e., 5 bytes. Since each font data is configured by 40 lines, the data size of black or yellow font data per character is 5 (bytes)×40 (lines)=200 bytes.

Figure 2B:
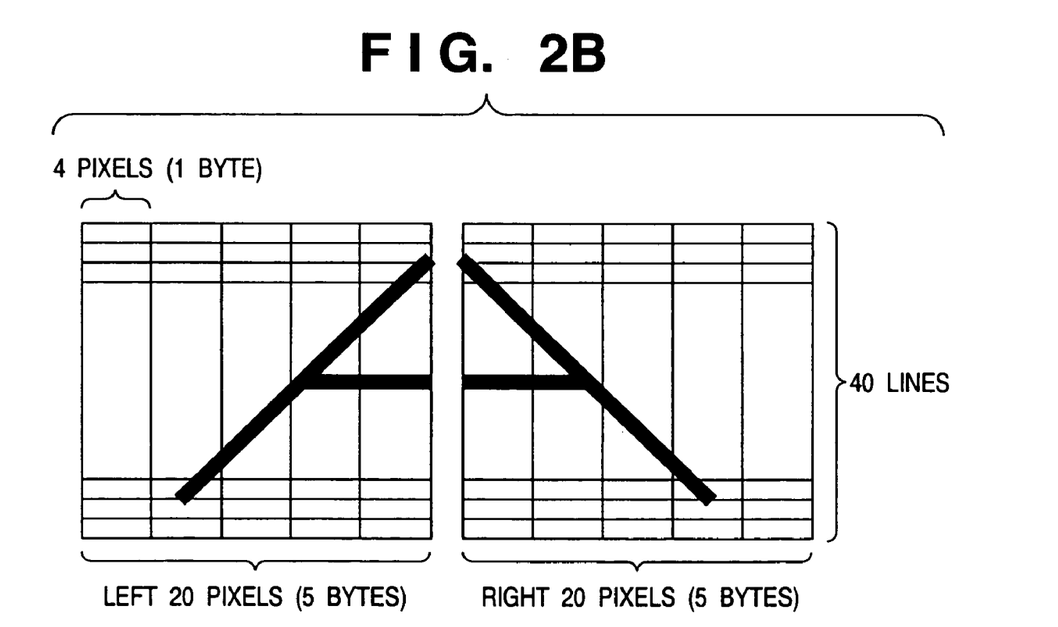
FIG. 2B shows the configuration of cyan and magenta font data.

FIG. 2B shows the configuration of cyan or magenta font data per character. Since each pixel is expressed by 2 bits, a configuration of 4 pixels/byte is adopted. In order to prevent an access method to font data from being changed due to different numbers of tone levels of black or yellow font data, cyan or magenta font data adopts the same 5 bytes×40 (=200) byte-configuration as that of black or yellow font data whose pixel is expressed by 1 bit. More specifically, the left half of cyan or magenta font data adopts a 5 bytes×40 byte-configuration, and the right half similarly adopts a 5 bytes×40 byte-configuration. Hence, one left half set includes 20 pixels of left half of the character font data, and one right half set includes 20 pixels of right half of the character font data.

Figure 3A:
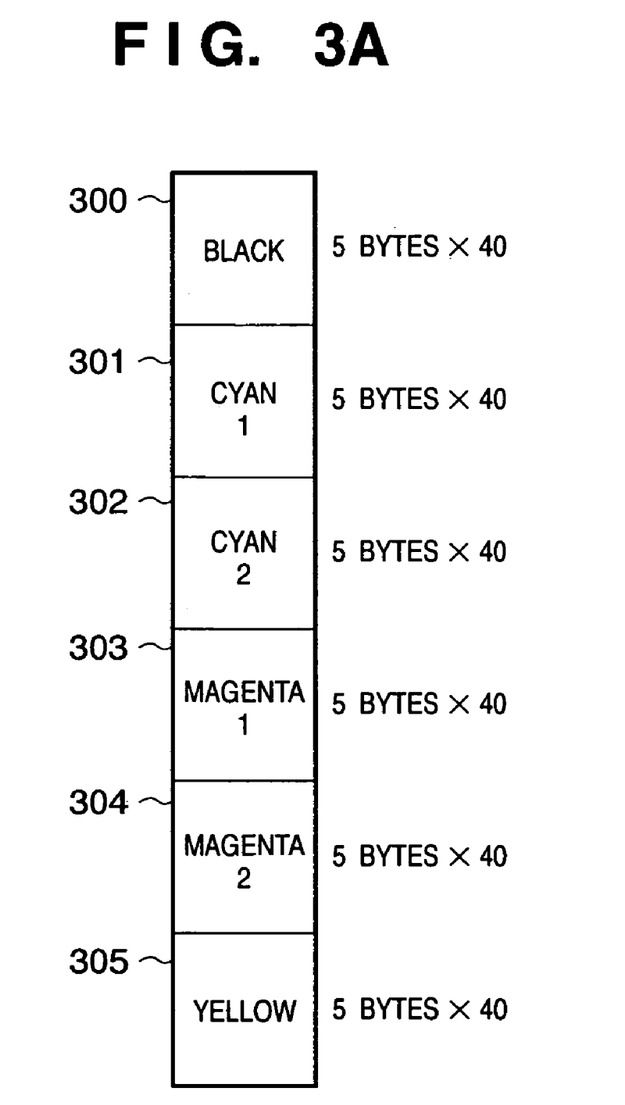
FIGS. 3A and 3B respectively depict a view (FIG. 3A) for explaining storage areas of font data of one character according to the embodiment of the present invention, and a view (FIG. 3B) for explaining a pointer that designates the storage address of font data in correspondence with a character code.

FIG. 3A depicts a view for explaining the allocations of font data of one character stored in the ROM 112.

In FIG. 3A, each of memory areas 300 to 305 has the same memory size, i.e., 5 bytes×40=200 bytes. The memory areas 300 and 305 respectively store black and yellow font data of a character, i.e., each memory area is 5 bytes×40=200 bytes, as described above. The memory areas 301 and 302 respectively store cyan font data of one character. The memory area cyan1 (301) stores the left half of cyan font data of the character shown in FIG. 2B, and the memory area cyan2 (302) stores the right half of cyan font data of the character shown in FIG. 2B. Likewise, the memory area magenta1 (303) stores the left half of magenta font data of the character, and the memory area magenta2 (304) stores the right half of magenta font data of the character.

Further, for example, if each pixel of cyan is expressed by 4 bits, the size of font data of one character of cyan, which is configured by 40×40 pixels, is 800 bytes, and the font data requires cyan1 to cyan4 in an example of FIG. 3A.

Figure 3B:
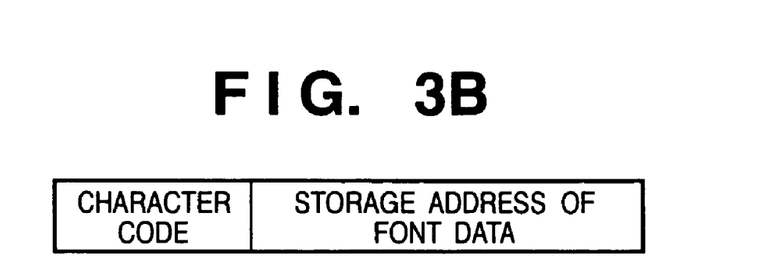

FIG. 3B depicts a view of explaining a pointer for designating an address (top address of black of a character in FIG. 3A) of font data of a character in accordance with a character code.

FIGS. 4A to 4E depict schematic views for explaining an example of the configuration of font data.

Figure 4A:
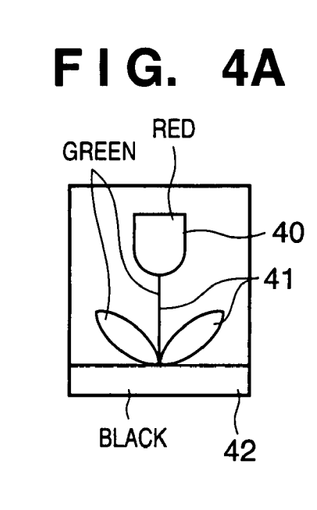
FIGS. 4A to 4E depict schematic views for explaining a practical example of the configuration of font data.

FIG. 4A depicts a pictorial symbol pattern corresponding to a given character code. As shown in FIG. 4A, a portion 40 of this pattern is red, a portion 41 is green, and a portion 42 is black.

Figure 4B:
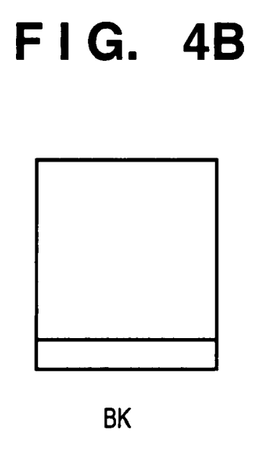
Figure 4C:
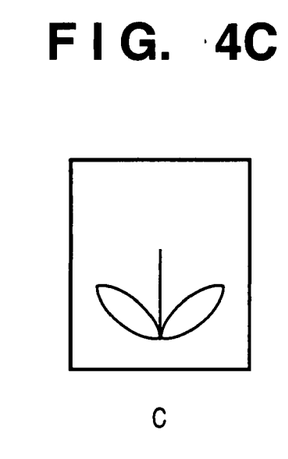
Figure 4D:
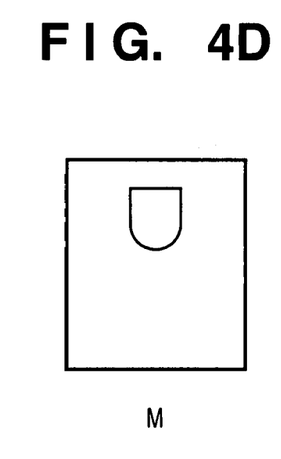
Figure 4E:
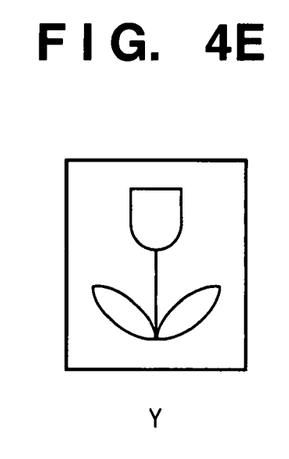

FIG. 4B shows black font data, and the black font data is font data corresponding to the portion 42 in FIG. 4A. FIG. 4C shows cyan font data, and the cyan font data is font data corresponding to the green portion 41 in FIG. 4A. This is because green is expressed by a mixture of cyan and yellow. FIG. 4D shows magenta font data, and the magenta font data is font data corresponding to the red portion 40 in FIG. 4A. This is because red is expressed by a mixture of magenta and yellow. Finally, FIG. 4E shows yellow font data, and the yellow font data is font data corresponding to the red and green portions 40 and 41 in FIG. 4A, because the red and green portions 40 and 41 include yellow. In the example, note that the number of tone levels of cyan and magenta font data is twice that of black and yellow font data, as described above.

The portion 40 of the pictorial symbol pattern rendered based on such font data is printed in red by yellow font data expressed in two tone levels, and magenta font data expressed in four tone levels. The portion 41 is printed in green by yellow font data expressed in two tone levels and cyan font data expressed in four tone levels. Furthermore, the portion 42 is printed in black by a black pattern in two tone levels.

Figure 5:
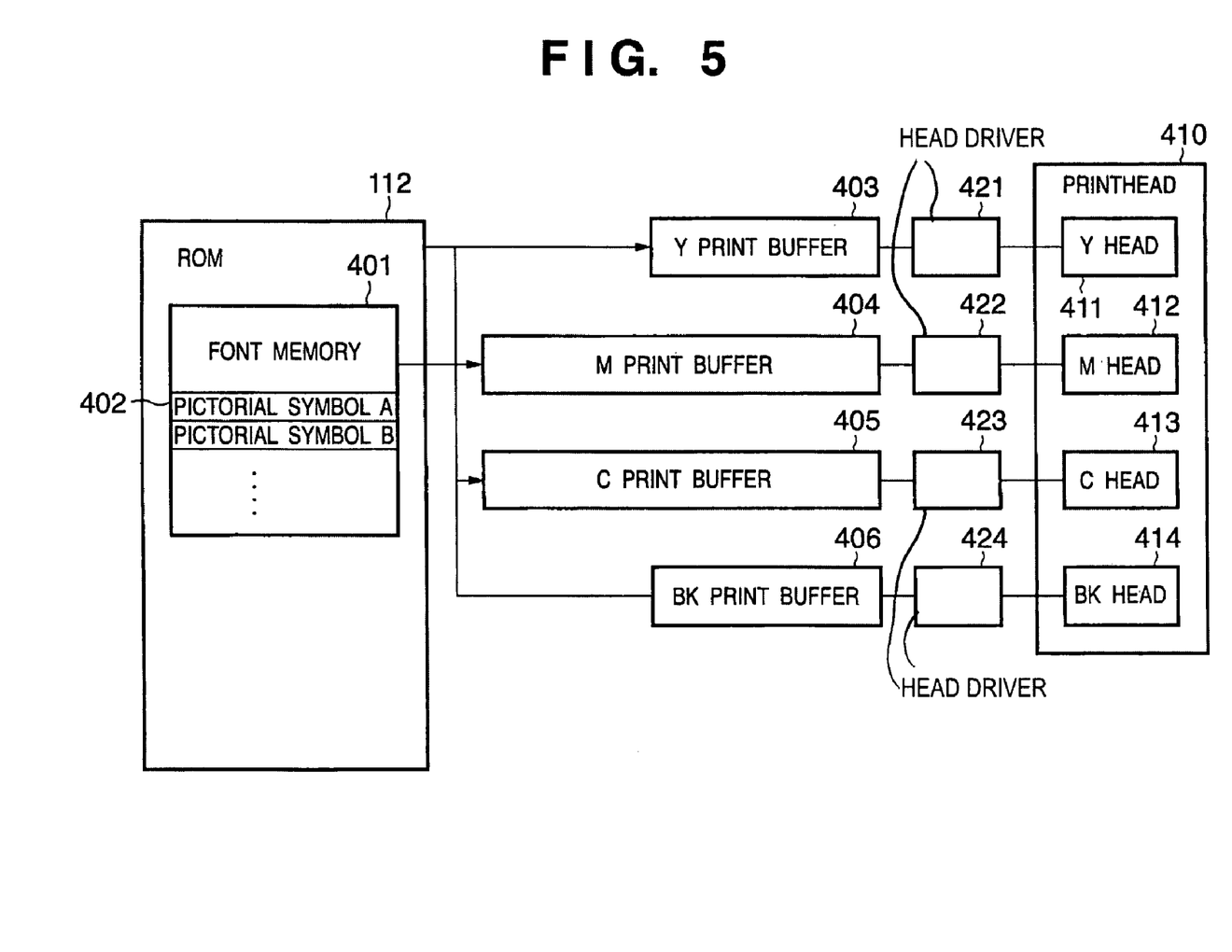
FIG. 5 is a diagram for explaining the flow of font data in the printing apparatus according to the embodiment of the present invention.

FIG. 5 is a diagram for explaining the flow of font data in the printing apparatus 1 according to this embodiment.

A font memory 401 is assured on the ROM 112. As has been explained using FIG. 3A, the data size of character font data 402 corresponding to each character code (e.g., a pictorial symbol code) is 1.2 kbytes (200 bytes each for black and yellow, and 400 bytes each for cyan and magenta: a total of 1,200 bytes). Reference numerals 403 to 406 respectively denote print buffers which respectively store print data corresponding to Y, M, C, and Bk colors for one band (corresponding to a data size to be printed per scan of a printhead 410). The size of each of the M print buffer 404 and C print buffer 405 is twice each of the remaining print buffers of colors having a half tone levels of that of the magenta and cyan, i.e., the Y print buffer 403 and Bk print buffer 406. Reference numerals 421 to 424 denote head drivers, which respectively drive corresponding Y, M, C, and Bk heads. Note that the head drivers 422 and 423 respectively drive M and C heads 412 and 413 in accordance with multi-valued print data, thus attaining multi-valued print processes.

The printhead 410 has a Y head 411 that ejects yellow ink, the M head 412 that ejects magenta ink, the C head 413 that ejects cyan ink, and a Bk head 414 that ejects black ink. The Y and Bk heads 411 and 414 print dots of the fixed size, and the M and C heads 412 and 413 can alternate the size of dots so that 4-valued print processes is performed according to print data. For example, each of the M and C heads 412 and 413 ejects ink droplets corresponding to large and small dots when print data is "3", ejects ink droplets for a large dot when print data is "2", ejects ink droplets for a small dot when print data is "1", and ejects no ink droplets when print data is "0", thus printing 4-valued pixel data. As a printhead that can attain a multi-level print process, a printhead which comprises a plurality of heaters having different heat capacities in respective nozzles and changes the size of ink droplets to be ejected by alternating the heaters to be heat-driven, or a printhead which changes the size of ink droplets by changing the driving voltage of heaters or piezoelectric elements in nozzles may be used.

The rendering process of such font data will be described below with reference to the flowchart in FIG. 6.

Figure 6:
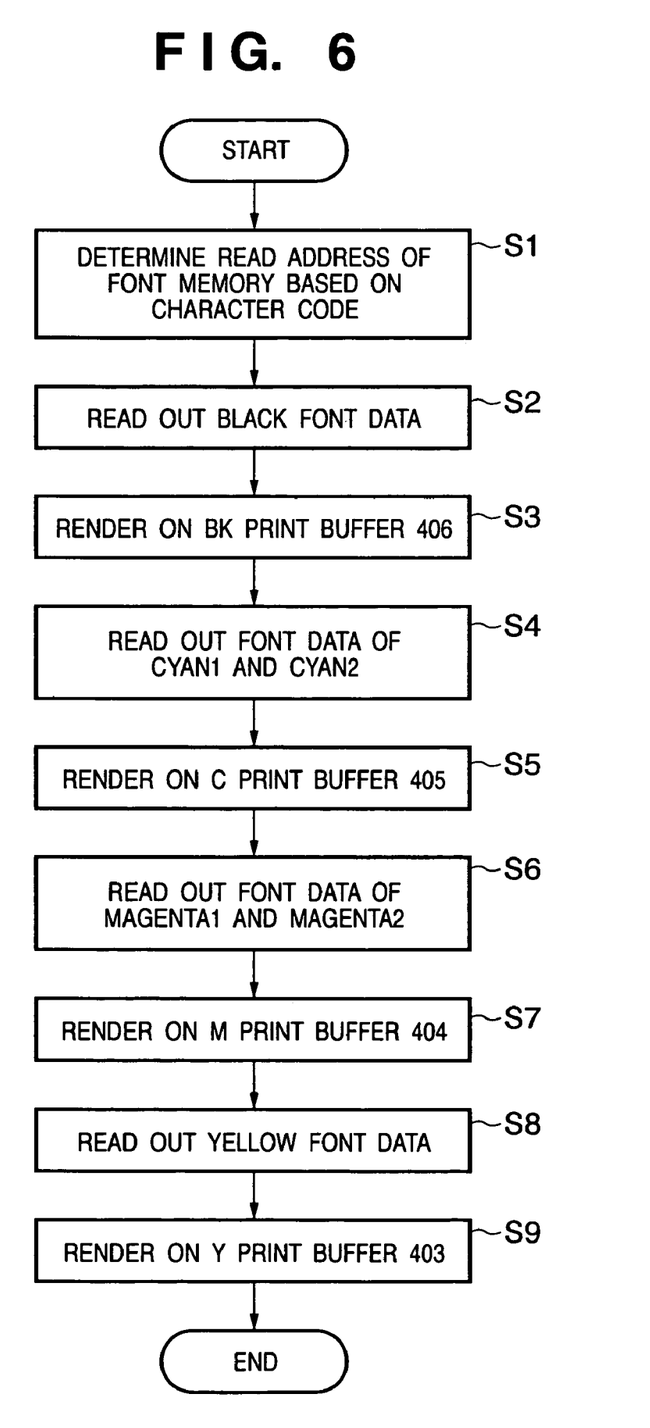
FIG. 6 is a flowchart for explaining a rendering process from a character code into print image data in the printing apparatus according to the embodiment of the present invention.

FIG. 6 is a flowchart for explaining a process for rendering a character code such as a special character (e.g., a pictorial symbol) or the like, which is included in a print command from the host computer 2, into image data with reference to the font memory 401 of the ROM 112. A program that implements this process is stored in the ROM 112, and is executed under the control of the CPU 111.

This process starts in response to detection of a character code of a special character such as a pictorial symbol or the like upon rendering a character code into image data. In step S1, based on the input character code, the top address of the font memory 401 which stores the font data corresponding to the character code is obtained. The top address can be obtained with reference to the pointer that is stored in the ROM 112 in correspondence with the character code and designates the top address of the font data, as shown in FIG. 3B. After the top address of the ROM 112 which stores the font data of the character is obtained, the flow advances to step S2 to read out black font data for 200 bytes from the top address. In step S3, the black font data is developed in the Bk print buffer 406. At this time, if the font data has no black pattern, the black font data is read out as all "0"s. This is applied to a case where font data of the remaining colors is read out, as described below.

Figure 7A:
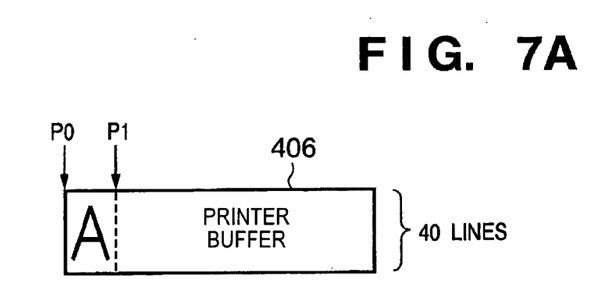
FIGS. 7A and 7B depict views for explaining the rendering process of print image data on a print buffer.

FIG. 7A shows an example of a state wherein the black (yellow) font data of character "A" is rendered on the Bk (Y) print buffer 406 (403) in this manner. Reference P0 denotes a start address where the font data of character "A" is to be rendered; and reference P1 denotes an end address where the font data of character "A" has been rendered.

Following rendering of the black font data, at step S4, the left half (200 bytes) of cyan font data is read out from the ROM 112 (cyan1), and then the right half (200 bytes) of the cyan font data is read out from the ROM 112 (cyan2). In step S5, the readout cyan font data is developed in the C print buffer 405.

Figure 7B:
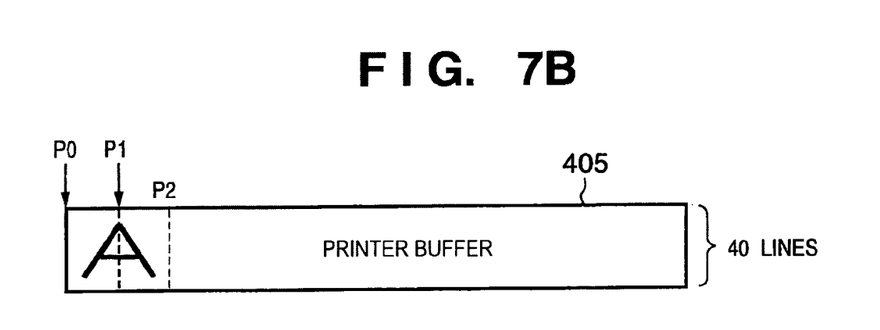

FIG. 7B shows an example of a state wherein the cyan (magenta) font data of character "A" is rendered on the C (M) print buffer 405 (404).

Likewise, at step S6, the left half (200 bytes) of magenta font data is read out from the ROM 112 (magenta1), and then the right half (200 bytes) of the magenta font data is read out from the ROM 112 (magenta2). In step S7, the readout magenta font data is developed in the M print buffer 404. The storage result of the M font data in the M print buffer 404 is as shown in FIG. 7B.

Finally, at step S8, 200-byte yellow font data is read out from the next address of the ROM 112, and is stored in the Y print buffer 403 in step S9. In this case, the storage result of the Y font data in the Y print buffer 403 is as shown in FIG. 7A in the same manner as the black font data.

In this way, the font memory 401 according to this embodiment stores black, cyan1, cyan2, magenta1, magenta2, and yellow data each for 200 bytes, so that when the top address of font data corresponding to a given character code is obtained, the font data is read out for 200 bytes and can be stored in turn in the Bk print buffer 406 once, the C print buffer 405 twice, the M print buffer 404 twice, and the Y print buffer 403 once. Hence, the reading process of the font data and the rendering process on the print buffers can be facilitated.

In FIG. 7A, P0 indicates the start address where black or yellow font data of a character is to be rendered, and P1 indicates the end address of stored print image data for the character. In FIG. 7B, P0 indicates the start address where cyan or magenta font data of a character is to be rendered, P1 indicates the end address of the stored print image data of the left half of the character, and P2 indicates the end address of the stored print image data of the right half of the character.

These addresses P0, P1, and P2 are stored in the work area of the RAM 113, and are updated upon rendering image data onto the print buffers. For this reason, the rendering addresses of font data for respective colors onto the print buffers can be easily obtained with reference to these addresses.

Upon rendering print image data onto the print buffers 403 to 406 in steps S3, S5, S7, and S9 in FIG. 6, the first 5 bytes of any of black, yellow, cyan, and magenta font data is assigned to the uppermost one of the 40 lines, and the next 5 bytes are assigned to the second uppermost line, as can be seen from FIGS. 2A to 3B. In this way, by lowering the rendering lines of the font data every 5-byte, each line of font data is easily read out from the font memory and can be rendered on the print buffers in a raster order.

Figure 8:
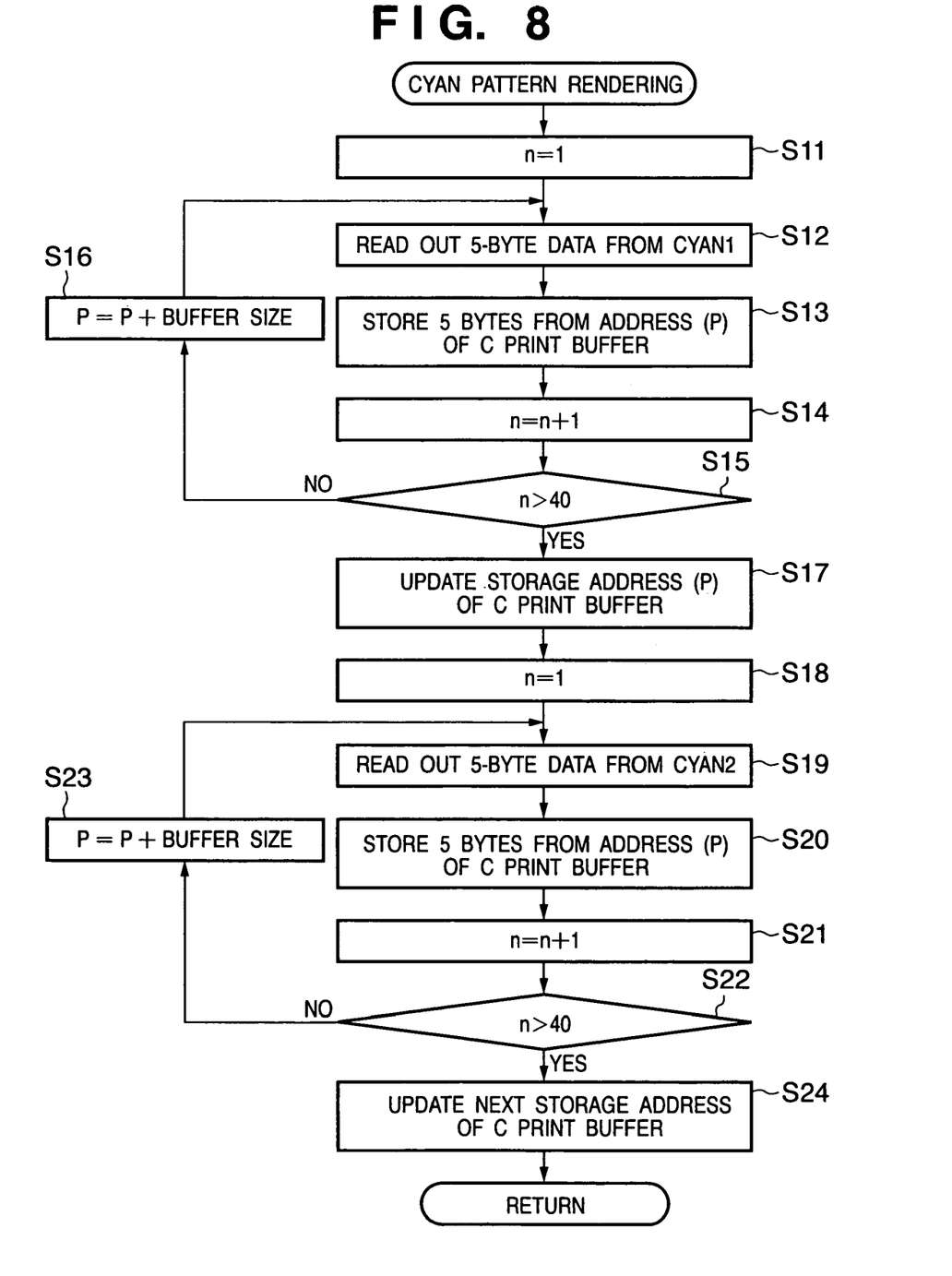
FIG. 8 is a flowchart for explaining a process for reading out cyan font data, and rendering it on a C print buffer.

FIG. 8 is a flowchart for explaining a process for reading out font data of cyan1 and cyan2 and rendering them on the C print buffer 405 in steps S4 and S5 in the flowchart of FIG. 6.

In step S11, a variable n which is assured on the RAM 113 is initialized to "1", the variable n is used to count the number of rendered lines. In step S12, only 5 bytes of font data are read out from cyan1. As can be seen from FIG. 2B, the 5-byte font data corresponds to 20 pixels of one line of the left half of cyan font data. In step S13, the 5-byte font data read in step S12 is stored from the address (storage top address P0) of the C print buffer 405. In step S14, the value of variable n is incremented by +1, and it is determined in step S15 whether the value of variable n has reached 40, i.e., if full font data of cyan1 is stored. If full font data of cyan1 is not stored, the flow advances to step S16 to obtain an address (P) where font data of the next line is stored in the C print buffer 405. As is apparent with reference to, e.g., FIG. 7B, after the 5-byte font data has been stored in the C print buffer 405 in step S13, the buffer length (buffer size) of the C print buffer 405 is added to the next address of the C print buffer 405, thus obtaining the storage start address of the next line. The flow advances to step S12 to read out the next 5-byte data (font data of the next line) from cyan1. In step S13, the font data is stored in the C print buffer 405 from the address obtained in step S16. Such process is executed until font data for all the lines of cyan1 has been stored in the C print buffer 405. After full font data of cyan1 has been stored in the C print buffer 405, the flow advances from step S15 to step S17.

In step S17, the storage start address (P0) of font data of cyan2 is determined. For example, "5" corresponding to 5 bytes is added to the aforementioned address P0 to obtain a new start address (note that one address corresponds to 1 byte in this case). In step S18, the variable n is initialized to "1". In steps S19 to S22, font data of cyan2 is rendered on the C print buffer 405 in the same manner as in the reading process of font data of cyan1 and the storage process in the C print buffer 405.

If full font data of cyan2 has been stored in the C print buffer 405, the flow advances from step S22 to step S24, and the start address (P0) in which the next cyan font data is stored is determined and stored in the same manner as in step S17.

Note that font data of magenta1 and mageta2 can be rendered on the M print buffer 404 in the same manner as cyan1 and cyan2, along with the flowchart of FIG. 8.

Furthermore, in black and yellow font data, 5 bytes express font data of one line, and the size of each of the black and yellow font data is half that of each of the cyan and magenta font data. Hence, the rendering process of the black and yellow font data can be implemented as the processes in steps S11 to S16 in FIG. 8.

[Another Embodiment]

In the first embodiment described above, when a character code of a pictorial symbol or the like is input, font data corresponding to the character code with respect to colors, i.e., black, cyan, magenta, and yellow are read out in turn. If it is possible to designate a color of a character corresponding to a character code, a character code attached no color designation is rendered by reading out only black font data. Hence, a character rendering process can be done more quickly.

When a character code attached color designation is rendered to color image data, only font data corresponding to the designated colors may be read out.

In the first embodiment, if black font data of a given character code does not exist, an invalid code such as a null code or the like may be stored in the area 300 in FIG. 3A. When black font data is read out in step S2 in the flowchart of FIG. 6, and it is recognized due to the presence of the invalid code that no corresponding black font data does not exist for the character code, the subsequent read process of black font data and the rendering process onto the print buffer 406 can be skipped, the storage address of the print buffer for the next font data is only updated, and the reading process and rendering process of the next cyan font data may start. This applies to font data of any colors. By this way, the rendering process of font data can be done more quickly.

In this case, all the print buffers 403 to 406 for respective colors must be initialized (e.g., to all "0"s) before starting the rendering process onto the print buffers.

The aforementioned font data can be obtained by applying 2- and 4-valued processes to 256-level pictorial symbol data for respective colors using error diffusion corresponding to respective colors. By printing using the font data, a pictorial symbol image with higher quality can be printed.

The objects of the present invention are also achieved by supplying a storage medium for recording a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements novel functions of the present invention, and the storage medium for storing the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

In the aforementioned embodiment, black and yellow data have two tone levels, and cyan and magenta data have four tone levels. However, the present invention is not limited to such specific data. For example, only back data may have two tone levels, and other color data may have three or more tone levels. Or the number of tone levels of font data of at least one color may be different from that of font data of other colors.

In the aforementioned embodiment, the process in the printing apparatus has been exemplified. However, the present invention is not limited to such specific embodiment. For example, the present invention can be applied to a case wherein the process described in the embodiment is implemented by a printer driver installed in a host computer.

As described above, according to this embodiment, font data including multi-level font data are stored for respective colors in correspondence with codes, and are read out in correspondence with an input code, thus expressing an image with good appearance.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-021318 filed on Jan. 29, 2004, which is hereby incorporated by reference.

What is claimed is:

1. A color printing apparatus comprising:
    color print means for printing in multi tone levels using at least yellow, magenta, cyan and black printing materials;
    font storage means for storing font data in advance, wherein the font data corresponds to the yellow, magenta, cyan and black colors has at least different tone levels for respective colors, in correspondence with a character code, and the font data of at least one of yellow, magenta, cyan and black colors is data having the multi tone levels being different from tone level of other font data;

development means for reading out the font data stored in said font storage means for respective colors, in correspondence to a code, and storing the font data for each color into a print buffer corresponding to each color; and control means for outputting the font data for each color stored in the print buffer to said color print means and controlling to cause said color print means to print an image corresponding to the code, wherein said font storage means stores font data of colors which can be printed by said color print means, and wherein the font data corresponding to the black color is binary data indicating the presence/absence of a pixel, and a data size of font data corresponding to each of yellow, magenta, and cyan colors is $2^n$, with n being a positive integer, times of the data size of the font data corresponding to black color.

2. The apparatus according to claim 1, wherein the number of pixels of the font data in a horizontal direction is set to be an integer multiple of a least common multiple of a bit length for representing each pixel of the font data corresponding to each color.

3. An apparatus according to claim 1, wherein said color print means has a plurality of print heads, each of said print heads ejects ink having a different color from each other, and said font storage means stores the font data having different tone levels for respective colors in correspondence with the ink ejected from said plurality of print heads.

4. A method of controlling a color printing apparatus having color print means for printing in multi tone levels using at least yellow, magenta, cyan and black printing materials, and font storage means for storing font data corresponding to the yellow, magenta, cyan and black colors and for respective colors including data of multi tone levels in advance, in correspondence with codes, wherein the font data of at least one of yellow, magenta, cyan and black colors is data having the multi tone levels being different from the tone level of other font data, the method comprising:

a development step of reading out the font data for respective colors stored in the font storage means in correspondence to a code, and storing the font data for each color into a print buffer corresponding to each color; and a control step of outputting the font data for each color stored in the print buffer to the color print means and controlling the color print means to print an image corresponding to the code, wherein the font storage means stores font data of colors which can be printed by the color print means, and wherein the font data corresponding to black color is binary data indicating the presence/absence of a pixel, and a data size of font data corresponding to each of yellow, magenta, and cyan colors is set to be $2^n$, with n being a positive integer, times of the data size of the font data corresponding to black color.

5. The method according to claim 4, wherein the number of pixels of the font data in a horizontal direction is set to be an integer multiple of a least common multiple of a bit length for representing each pixel of the font data corresponding to each color.

6. A method according to claim 4, wherein the color print means has a plurality of print heads, each of the print heads ejecting ink having a different color from each other, and the font storage means stores the font data having different tone levels for respective colors in correspondence with the ink ejected from the plurality of print heads.

* * * * *

UNITED STATES PATENT AND TRADEMARK OFFICE
CERTIFICATE OF CORRECTION

| | | |
|---|---|---|
| PATENT NO. | : 7,144,167 B2 | Page 1 of 1 |
| APPLICATION NO. | : 11/043071 | |
| DATED | : December 5, 2006 | |
| INVENTOR(S) | : Yoshiyuki Shimamura | |

It is certified that error appears in the above-identified patent and that said Letters Patent is hereby corrected as shown below:

COLUMN 1:

Line 35, "8-bit" should read --8-bit data--.

COLUMN 2:

Line 61, delete "PREFERRED" and "THE" should read --THE PREFERRED--.

COLUMN 6:

Line 47, "5-byte," should read --5 bytes--.

COLUMN 7:

Line 54, "no" should be deleted.

Signed and Sealed this

Seventeenth Day of June, 2008

JON W. DUDAS
*Director of the United States Patent and Trademark Office*